United States Patent
Demiral

(10) Patent No.: US 11,079,237 B2
(45) Date of Patent: Aug. 3, 2021

(54) METHOD FOR DETERMINING A RELATIVE POSITION OF A MOTOR VEHICLE, POSITION DETERMINATION SYSTEM FOR A MOTOR VEHICLE AND MOTOR VEHICLE

(71) Applicant: AUDI AG, Ingolstadt (DE)

(72) Inventor: Christopher Demiral, Ingolstadt (DE)

(73) Assignee: AUDI AG, Ingolstadt (DE)

(*) Notice: Subject to any disclaimer, the term of this patent is extended or adjusted under 35 U.S.C. 154(b) by 193 days.

(21) Appl. No.: 16/463,149

(22) PCT Filed: Nov. 9, 2017

(86) PCT No.: PCT/EP2017/078685
§ 371 (c)(1),
(2) Date: May 22, 2019

(87) PCT Pub. No.: WO2018/108397
PCT Pub. Date: Jun. 21, 2018

(65) Prior Publication Data
US 2019/0293432 A1     Sep. 26, 2019

(30) Foreign Application Priority Data
Dec. 15, 2016   (DE) .......................... 102016225140.6

(51) Int. Cl.
*G01C 21/12*    (2006.01)
*B62D 15/02*    (2006.01)
(Continued)

(52) U.S. Cl.
CPC .......... *G01C 21/165* (2013.01); *B62D 15/02* (2013.01); *B62D 15/021* (2013.01); *G01C 22/02* (2013.01); *G07C 5/085* (2013.01)

(58) Field of Classification Search
CPC ........ G01C 21/16; G01C 21/165; G07C 5/08; G07C 5/085; B62D 15/02; B62D 15/021
See application file for complete search history.

(56) References Cited

U.S. PATENT DOCUMENTS 8,063,825 B1 *  11/2011  Yang ....................... G01S 5/009
                                                         342/458
8,886,410 B2    11/2014  Kang et al.
(Continued)

FOREIGN PATENT DOCUMENTS

DE   102005018834 A1   10/2006
DE   102008045618 A1   3/2010
(Continued)

OTHER PUBLICATIONS

International Search Report and Witten Opinion of the International Searching Authority directed to related International Patent Application No. PCT/EP2017/078685, dated Feb. 19, 2018, with attached English-language translation; 15 pages.
(Continued)

*Primary Examiner* — Tan Q Nguyen
(74) *Attorney, Agent, or Firm* — Sterne, Kessler, Goldstein & Fox P.L.L.C.

(57) ABSTRACT

The invention present application relates to a method for determining a current position $(x_{k+1}, y_{k+1})$ of a motor vehicle relative to an initial position $(x_k, y_k)$ previously held by the motor vehicle. Changes in the wheel position between the initial position $(x_k, y_k)$ and the current position $(x_{k+1}, y_{k+1})$ are measured for at least two wheels of the motor vehicle. A motion vector of the motor vehicle is individually calculated from each of the wheel position changes. The individual motion vectors are then averaged. The current position $(x_{k+1}, y_{k+1})$ is then determined by adding the averaged motion vector, which, starting from a reference direction, has been rotated by a yaw angle of the motor vehicle, wherein the yaw
(Continued)

angle is determined using a yaw rate provided by a yaw rate sensor of the motor vehicle. The invention also relates to a position determination system and to a motor vehicle equipped with such a system.

20 Claims, 1 Drawing Sheet

(51) Int. Cl.
  *G01C 21/16*  (2006.01)
  *G07C 5/08*  (2006.01)
  *G01C 22/02*  (2006.01)

(56) References Cited

U.S. PATENT DOCUMENTS

| | | |
|---|---|---|
| 10,018,473 B2 | 7/2018 | Mizutani et al. |
| 2002/0040849 A1* | 4/2002 | Yamamoto ............ C25D 17/001 204/434 |
| 2003/0040849 A1 | 2/2003 | Hathout et al. |
| 2008/0201038 A1* | 8/2008 | Jung ....................... B60T 8/172 701/41 |
| 2008/0294342 A1 | 11/2008 | Hoshizaki et al. |
| 2012/0016646 A1* | 1/2012 | Takenaka ............ B60W 40/101 703/2 |
| 2014/0145498 A1* | 5/2014 | Yamakado ............ B60W 30/02 303/3 |
| 2014/0172241 A1* | 6/2014 | Shima ................. B60C 23/0488 701/49 |
| 2017/0261326 A1* | 9/2017 | Mizutani ................... G01P 3/50 |

FOREIGN PATENT DOCUMENTS

| | | |
|---|---|---|
| DE | 102014202369 A1 | 8/2014 |
| WO | WO-2016/039411 A1 | 3/2016 |

OTHER PUBLICATIONS

International Preliminary Report on Patentability directed to related International Patent Application No. PCT/EP2017/078685, dated Jun. 18, 2019, with attached English-language translation; 13 pages.

* cited by examiner

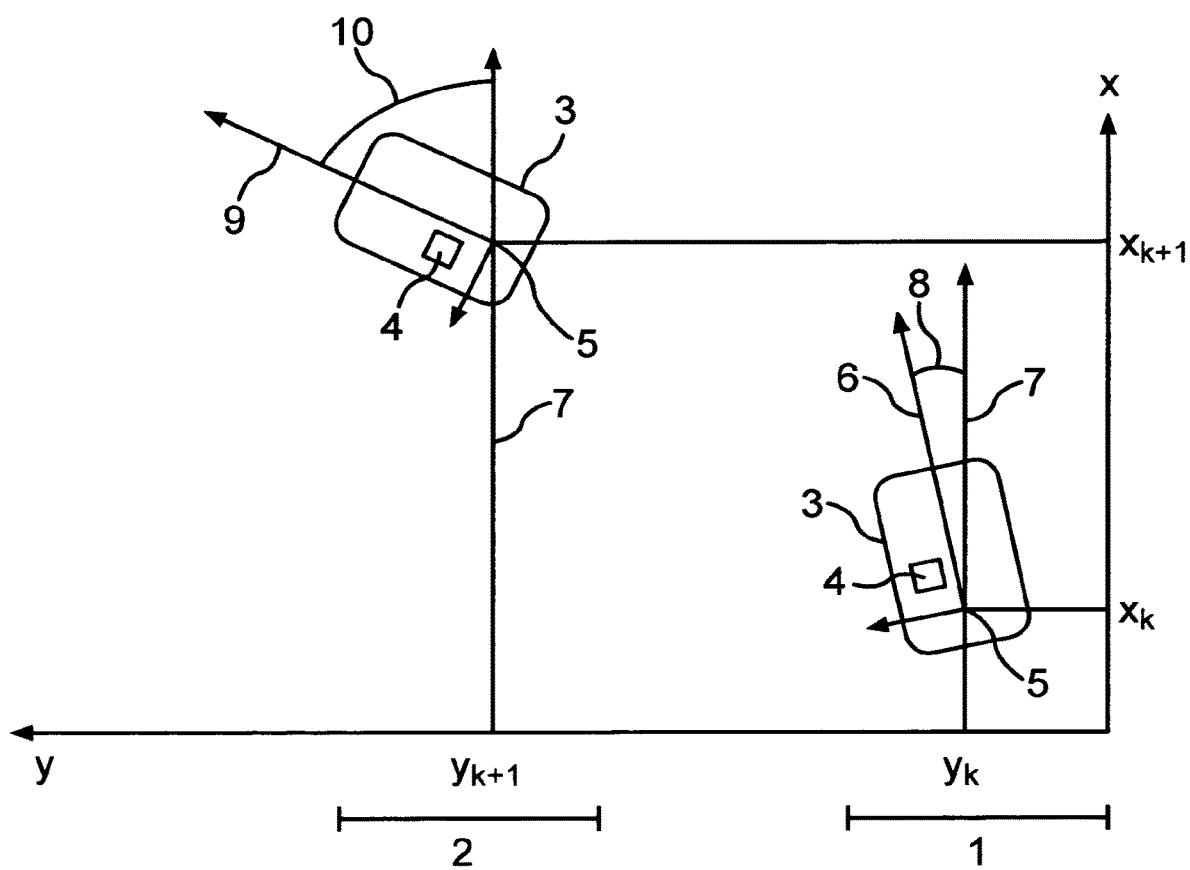

METHOD FOR DETERMINING A RELATIVE POSITION OF A MOTOR VEHICLE, POSITION DETERMINATION SYSTEM FOR A MOTOR VEHICLE AND MOTOR VEHICLE

TECHNICAL FIELD

The present application relates to a method for determining a current position of a motor vehicle relative to an initial position previously held by the motor vehicle and a corresponding position determination system for a motor vehicle and a motor vehicle having such a position determination system.

BACKGROUND

Nowadays it is common that sensors, for example, environment observation sensors of a motor vehicle, deliver a sensor or measured value at a fixed measurement time point. In order to enable the meaningful tracking and processing of a plurality of successive measurements and/or the meaningful and/or to be able to consistently add data from a plurality of sensors with different measurement time points during a motion of the motor vehicle, a respective change in position of the sensor or the vehicle between the respective measurement time points is required. There are different approaches for this in the prior art. A first approach uses an integration of measurement data from an inertial sensor system. A central aspect can be expressed by the following equations, which describe a calculation of a current position—described by the coordinates $x_{k+1}$, $y_{k+1}$—from a previous position—described by the coordinates $x_k$, $y_k$:

$$x_{k+1} = x_k + v/\text{yawrate} \cdot [-\sin(\text{yaw}_k) + \sin(\Delta_t \cdot \text{yawrate} + \text{yaw}_k)]$$

$$y_{k+1} = y_k + v/\text{yawrate} \cdot [\cos(\text{yaw}_k) - \cos(\Delta_t \cdot \text{yawrate} + \text{yaw}_k)],$$

with the yaw angle $\text{yaw}_k$ and the yaw rate yawrate.

The disadvantage is that for small yaw rates yawrate, as they often occur with every straight-ahead driving and parking, the denominator of the respective fraction becomes small so that the change of the position becomes unsteady so to speak and can only be effectively determined with low resolution. Herein, the yaw rate must be neglected from a lower threshold value onwards and the calculation rule must be changed. However, this causes an overall deterioration in accuracy in determining the position or change in position.

A second approach uses odometry. Herein, the calculation of the position and an alignment of the motor vehicle takes place directly from path impulses from the wheel encoders of individual wheels, taking into consideration an Ackermann control of the motor vehicle. A change in the alignment is calculated either from a difference of the motions of the individual wheels on an axle or from the wheel steering angle, speed, and wheelbase. The path impulses for the individual wheels are supplied by wheel encoders in production vehicles, which offer only a low resolution, so that a new path impulse is only supplied after a motion or traveled distance of 0.02 m, for example. This low resolution of the wheel encoders leads to problems, especially when driving slowly, as the respective measured values change in a volatile manner. In particular, this volatile or jerky detected change of the alignment has a negative effect on the processing of data from the environment observation sensor system. In particular, parking maneuvers that require centimeter precision cannot be implemented satisfactorily, especially in autonomous or semi-autonomous operation.

From DE 10 2005 018 834 A1 a system and a method for determining the current position and alignment of a motor vehicle are known. A transponder unit of the motor vehicle serves for the detection of a position of a transponder, which is passed by the motor vehicle.

DE 10 2014 202 369 A1 describes a method for the control/adjustment of four-wheel steered vehicles. A rear wheel steer angle is detected and, based thereon and on a scaling factor, a forward control/adjustment lateral acceleration value, is determined. In reaction to this value, a control/adjustment of an operation occurs from the steerable front wheels and the steerable rear wheels. An overall effective steer angle value can be determined based on the front wheel steer angle, the effective rear wheel steer angle and a double Ackermann geometry steer angle value.

DE 10 2008 045 618 A1 discloses a method and an apparatus for calibrating sensors of a vehicle. During a drive of the vehicle, sensor position data are detected by means of a sensor to be calibrated and model position data are identified. The model position data are formed by means of a driving state variable of the vehicle and fed to a vehicle model, wherein the model position data are used to determine a sensor position of the sensor to be calibrated. A vehicle position, a steer angle, a yaw angle and/or variables identified from these can be detected as driving state variables.

BRIEF DESCRIPTION OF THE DRAWINGS/FIGURES

FIG. 1 is a schematic top view of a motor vehicle, in accordance with some embodiments.

DETAILED DESCRIPTION

It is an object of the present application to improve the determination of the relative position of a motor vehicle.

This object is achieved by the subject matter of the independent claims. Advantageous embodiments of the present application are indicated in the dependent claims as well as in the following description and in the drawing.

In accordance with some embodiments, a method for determining a current position of a motor vehicle relative to an initial position previously held by the motor vehicle is disclosed. The method comprises several steps, as explained below. First, a respective wheel position change in the circumferential direction between the initial position and the current position of the motor vehicle is measured for at least two wheels of the motor vehicle by means of a respective sensor device. The wheel position changes of the individual wheels therefore indicate how far or at what angle the respective wheel is rotated, rolled or unrolled from the initial position to the current position when the motor vehicle moves. The wheel position change can be determined, for example, by means of a wheel encoder. The respective wheel position changes can also be measured for more than two wheels—especially for conventional passenger cars preferably for four or all wheels.

In accordance with some embodiments, in an additional method step, a respective motion vector of the motor vehicle is determined individually from each of the measured wheel position changes by means of a calculation device of the motor vehicle. In other words, a motor vehicle motion vector is calculated for a single wheel from its wheel position change and this is performed separately or independently for each of the wheels whose wheel position changes have been measured. The determination of the individual motion vectors can be carried out one after the other or in parallel, which can be dependent on the concrete design and computing capacity of the calculation device, for example. For example, a wheel position change can be measured independently of each other for four wheels of the motor vehicle, so that there are now four individual motion vectors of the motor vehicle calculated thereof.

In accordance with some embodiments, these determined or calculated motion vectors are averaged. All previously individually available motion vectors for the respective motion of the motor vehicle from the initial position to the current position are therefore calculated into a single averaged motion vector of the motor vehicle. The motion vector here is a vectoral variable that describes or characterizes the motion of the motor vehicle. For example, the motion vector can have an x- and a y-component to describe a motion in a plane in which the vehicle moves. A predetermined coordinate system can be defined and preset as a reference. The reference coordinate system, i.e. the reference x-direction and the reference y-direction, can be fixed and independent from an actual current alignment or motion of the motor vehicle. However, it is also possible to use, for example, a previous direction of motion or driving direction of the motor vehicle as a reference direction. For example, the direction of the motion which brought the motor vehicle to its initial position can serve as the reference direction for the motion from the initial position to the current position. The latter can then serve as a reference direction for a subsequent motion of the motor vehicle from the current position to a future position, resulting in an iterative or interlinked process. Another possibility may be, for example, to use an alignment given at the last initial operation of the motor vehicle as a reference direction during current operation until the motor vehicle is switched off.

In accordance with some embodiments, the current position of the motor vehicle is determined by means of the calculation device by adding the averaged motion vector of the motor vehicle, which is rotated starting from the reference direction by a respective yaw angle of the motor vehicle, to the initial position. The initial position, therefore, serves as the initial point or the starting point for the motion vector. The yaw angle is determined using a yaw rate provided by a yaw rate sensor of the motor vehicle and indicates the alignment of the motor vehicle. Preferably, a time span can be detected which is required for the motion of the motor vehicle from the initial position to the current position. The yaw angle can then be determined preferably by multiplying this time span by the average yaw rate calculated for this time span. Alternatively, a current or last determined value of the yaw rate can be used advantageously, whereby a calculation or data processing effort can be minimized if necessary. Due to the typical mass and acceleration of the motor vehicle a change in the yaw rate during the preferably considered time periods has no significant influence, a resulting theoretical error during the determination of the current position can be neglected. The time spans considered can be in the order of 10 to 100 ms, in particular, but in any case shorter than one second. The yaw angle can also be determined directly by integrating the yaw rate measured during the time span.

Accordingly, in accordance with some embodiments, the method can determine the current position of the motor vehicle relative to or from the initial position previously held. The current position can then, in turn, serve as the initial position for an additional, subsequent position determination. In this way, by iterative or repeated application of the method, it is possible to determine or track a route of the motor vehicle, step by step or in portions, without requiring or having to use any external position determining means, such as a satellite-based navigation system. This allows the current position of the vehicle to be determined advantageously, for example, in buildings, underground or in general in situations without a reliable data connection to devices outside the vehicle. In addition, the achievable accuracy can be adjusted, in particular, improved, with considerably less effort than, for example, with the use of a satellite-based navigation system.

In accordance with some embodiments, by using the wheel position changes, i.e. the corresponding sensor or measured values or information for a plurality of wheels, an improvement in the effective resolution and accuracy can be achieved advantageously when determining the motion vector of the motor vehicle and ultimately the current position of the motor vehicle. For example, to determine the wheel position change, favorable wheel encoders with a limited angular resolution can be used. By averaging, up to N times the resolution compared to the use of a single wheel encoder can be achieved by using N wheel encoders due to position differences of the respective wheel encoders for the individual wheels as a whole. For example, the use of 4 wheel encoders can ideally achieve four times the resolution or accuracy. A single wheel encoder can, for example, have a ring or circular toothing having for example, 48 teeth and therefore 96 flanks, which rotate with the respective wheel and are used to detect the rotation of the wheel.

For the purposes of this present application, the terms "wheel" and "wheels" are used to refer to appropriately formed ground contact elements of the motor vehicle. In other words, the motor vehicle is supported during a motion or during a drive—in particular from the initial position to the current position—along and on a roadway via the respective wheel or via the respective wheels or ground contact elements, wherein the wheel or wheels roll along and on the roadway.

In accordance with some embodiments, the average yaw angle of the motor vehicle between the initial position and the current position can be used as the yaw angle when determining the current position. If, for example, the vehicle moves on an arc of a circle, i.e. it takes a curve, it actually moves in continuously changing directions. By using the average yaw angle, i.e. the center direction, alignment or driving direction of the motor vehicle during motion on the arc between the initial position and the current position, an error during the determination of the current position can be advantageously reduced compared to classical approaches that use the first or last detected alignment, for example.

The current position $P_{k+1}$ can be preferred as $$P_{k+1} = P_k + s \cdot R(\delta),$$

wherein $P_k$ is the initial position, s is the averaged motion vector, $R(\delta)$ is a rotation matrix around the angle $\delta$ designated as $$\delta = yaw_k + 0.5 \cdot \Delta_t \cdot yawrate$$

wherein yawrate indicates the yaw rate provided by the yaw rate sensor of the motor vehicle and the current yaw angle $yaw_{k+1}$ of the motor vehicle in the current position is calculated from the yaw rate yawrate and a yaw angle $yaw_k$ present in the initial position as $$yaw_{k+1} = yaw_k + yaw\ rate \cdot \Delta_t,$$

wherein $\Delta_t$ indicates the period of time elapsed during the motion of the motor vehicle from the initial position to the current position.

The averaged motion vector s can be a two-dimensional vector with an x- and a y-component according to $s=(s_x, s_y)$. The rotation matrix R can be given for a rotation in a plane as $$R = \begin{pmatrix} \cos\delta & -\sin\delta \\ \sin\delta & \cos\delta \end{pmatrix}.$$

The variables $P_k$, $P_{k+1}$ and s displayed with bold formatting are vectoral variables.

This advantageously results in an equation system that has no discontinuity point and can, therefore, be used continuously and easily for all driving maneuvers. For example, there are no numerical problems at very low yaw rates. This makes the corresponding method, especially in the implementation type described herein, particularly suitable for determining the position and tracking the path or trajectory of the vehicle during autonomous or semi-autonomous shunting or parking maneuvers. The position data obtained by the use of the method in accordance with some embodiments can advantageously be provided to a driver assistance system of the motor vehicle, for example, a trajectory-following control.

In accordance with some embodiments, it may be provided that when determining the motion vector of the motor vehicle from the individual wheel position changes, a respective wheel steering angle and/or an Ackermann geometry of the motor vehicle are taken into account. In other words, data or measured values provided by additional or separate steering angle sensors, as well as vehicle-specific data such as the size, assembly and/or place of the respective lever arms of an Ackermann steering of the vehicle, can be evaluated and taken into account. This allows accuracy and reliability to be achieved in the determination of the motion vectors and thereby ultimately also in the determination of the current position of the motor vehicle. It is also possible to use the data concerning the wheel steering angles and/or the Ackermann geometry to check the plausibility of the other measured values and/or calculated variables. Such an enlarged database can contribute advantageously to increasing safety, which is particularly relevant and advantageous for autonomous or semi-autonomous driving maneuvers and/or assistance systems of the motor vehicle.

In accordance with some embodiments, it may be provided that, when determining the respective motion vector of the motor vehicle, the individual wheel position changes are converted into a respective motion vector of a vehicle's own reference point, wherein the same reference point is being used for all wheel position changes. Thereby, the individual wheel position changes result in respective calculated motions or motion vectors of the vehicle's own and vehicle-fixed reference point as motions or motion vectors of the motor vehicle. By viewing a single reference point or by referring to a single reference point, a simpler calculation and modeling of the motion of the motor vehicle and thereby also the determination of the current position can be realized or implemented. For example, the reference point can be the center of a rear axle of a motor vehicle. By using such a set common reference point, consistency and comparability of all calculated data can be ensured in a particularly simple way. This applies both to different data relating to the same motor vehicle and to data relating to different motor vehicles.

In accordance with some embodiments, it may be provided that an updated value of the yaw rate is provided by the yaw rate sensor at least every 20 ms, preferably every 10 ms. In other words, the yaw rate sensor can have a sampling or measuring rate of at least 50 Hz, preferably at least 100 Hz. This ensures that data is available at all times that is up-to-date enough to allow sufficient accuracy in determining the current position of the vehicle. In particular, this ensures sufficient accuracy for any driving maneuver. In a corresponding manner, the sensor device or sensor devices, for example, preferably at least every 20 ms or every 10 ms, can also preferably detect and provide a current value of the respective change in the wheel position or of the respective angular position or rotation of the respective wheel.

In accordance with some embodiments, it is provided that the wheel position changes are measured for wheels which are spaced apart along a longitudinal extension of the motor vehicle. In other words, for example, the respective wheel position changes can be measured for at least one front wheel and one rear wheel of the motor vehicle. For a precise determination of the current position, it may be particularly advantageous if wheel position changes are measured and processed or used both by at least one steered wheel and by at least one non-steered wheel, since—in particular during cornering-different conditions and behavior patterns for the wheels are present or may occur here. The wheels whose wheel position changes are measured can therefore be arranged on different axles, wherein at the respective position in the vehicle longitudinal direction of a wheel only this one wheel can be arranged or, however, several wheels can be arranged. In other words, for example, the respective wheel position changes for all or any selection of wheels of a three-wheeled or tricycle-like motor vehicle can also be measured.

In accordance with some embodiments, a position determination system for a motor vehicle for determining a current position of the motor vehicle relative to an initial position previously held by the motor vehicle is disclosed. The position determination system comprises at least two sensor devices for measuring a respective wheel position change in the circumferential direction of at least two wheels. For example, a separate sensor device can be provided for each wheel whose wheel position change is measured. However, the sensor devices may also be understood and designed as parts of a single larger or more comprehensive sensor apparatus. The position determination system, in accordance with some embodiments, also comprises a calculation device and a yaw rate sensor and is designed to carry out a method as described herein. In particular, the calculation device may have respective interfaces for receiving measured values or sensor data from the sensor devices and the yaw rate sensor. The calculation device can be directly or indirectly connected to the sensor devices and the yaw rate sensor via appropriate data connections. The transmission of measured values or sensor data can, for example, also take place via a board network, such as a CAN (Controller Area Network) bus. The calculation device may, for example, be a control unit and comprise a processor and a memory device. The fact that the position determination system is set up to carry out the method as described herein in accordance with some embodiments may mean, for example, that a program code is stored in the memory device which codes or represents the method and calculation steps necessary for carrying out the method.

In accordance with yet another embodiment, a position determination system for a motor vehicle for determining a current position of the motor vehicle relative to an initial position previously held by the motor vehicle may also be limited to the calculation device configured to receive the described measured values or sensor data relating to the wheel position changes, the yaw rate and the yaw angle.

In accordance with yet another embodiment, the position determination system can be limited to the memory device with the described program code.

In accordance with some embodiments, it may be provided that vehicle specific variables, such as the size of the motor vehicle or of parts of the motor vehicle, in particular, the wheels, are stored in the storage device or the memory device. For example, data concerning the slip behavior of the wheels can also be stored. This data can, for example, be stored in a characteristic map. The characteristic map may also contain, for example, a vehicle speed and/or a curve radius as additional variables or parameters.

In accordance with some embodiments, a motor vehicle is disclosed. The motor vehicle comprises a position determination system. In particular, the motor vehicle may have sensor devices for measuring a respective wheel position change in the circumferential direction of at least two wheels and at least one yaw rate sensor and a calculation device.

The embodiments of the method, the position determination system and the motor vehicle as described herein and the respective advantages described above are mutually exchangeable and transferable between the method, the position determination system and/or the motor vehicle as described herein in accordance with some embodiments. This shall also apply to parts and devices used or usable for carrying out the method as described herein in accordance with some embodiments. In addition, individual features, embodiments of the present application or parts thereof described so far and in the following may also be used individually and in any combinations not explicitly described individually here in order to obtain different embodiments of the present application. For this reason, the corresponding developments of the method as described herein are not described again here for the position determination system and the motor vehicle according to some embodiments of the present application.

Additional features, details, and advantages of the present application result from the following description of a preferred exemplary embodiment as well as from the drawing which illustrates a preferred exemplary embodiment of the present application. FIG. 1 shows a schematic top view of a motor vehicle, in accordance with some embodiments. FIG. 1 shown the motor vehicle in an initial position and a current position as well as a two-dimensional coordinate system serving as a reference.

The exemplary embodiment described below is a preferred embodiment of the present application. In this exemplary embodiment, the described components of the embodiment constitute individual features of the present application that are to be considered independently of one another, which features contribute independently to the development of the present application and should thereby be considered individually or in a combination other than that shown to be a constituent of the present application. In addition, features of the present application additional to those already described can also be added to the described embodiment.

FIG. 1 is a schematic top view that shows an initial situation 1 and a current situation 2, in each of which a motor vehicle 3 is shown in a certain position or alignment. The initial situation 1 is to be understood as being temporally ahead of the current situation. A spatial relation between the initial situation 1 and the current situation 2, that is to say also between the respective placements or positions of the motor vehicle 3, is illustrated by means of a coordinate system having an x-axis or -direction and a y-axis or -direction.

The motor vehicle 3 comprises a position determination system 4 by means of which a respective position of the motor vehicle 3 can be determined. The respective position of the motor vehicle 3 is described and indicated by a respective position of a vehicle-specific and vehicle-fixed reference point 5. In this case, the reference point 5 is the center of a rear axle of the motor vehicle 3 which is not shown here. Alternatively, any other points, positions or parts that can be defined as fixed to the vehicle could be used as reference point 5.

A plane is spanned by the axes of the coordinate system in which the motor vehicle 3 moves or is located. In the initial situation 1, the motor vehicle 3 is in an initial position which is defined by the coordinates $x_k$, $y_k$. In this initial position, the motor vehicle 3 is oriented according to an initial alignment 6. The alignment of the motor vehicle is defined here as a direction of a central axis in the forward longitudinal direction of the motor vehicle 3. In principle, other definitions of the respective alignment of the motor vehicle 3 are also possible here as an alternative, provided that these are treated consistently in all measures and calculations for position determination. In this case, a reference direction 7, which corresponds to the direction of the x-axis of the coordinate system, is defined and specified. The respective alignment of the motor vehicle, in this case the initial alignment 6, can be described relative to reference direction 7 by specifying a yaw angle. For the initial situation 1, the initial alignment 6 is indicated, for example, by the indication of an initial yaw angle 8, which indicates or describes a deviation of the initial alignment 6 from the reference direction 7.

Starting from the initial situation 1, the motor vehicle 3 has moved so that the current situation 2 represents the current position of the motor vehicle 3. In the current situation 2, the current position of the motor vehicle 3 is also indicated by the current position of the reference point 5. In the current situation 2, the current position of the reference point 5 is defined by the coordinates $x_{k+1}$, $y_{k+1}$. In addition to the change in position between the initial situation 1 and the current situation 2, a change in the alignment of the motor vehicle 3 also occurred during the corresponding motion of the motor vehicle 3. In the current situation 2, the motor vehicle 3 now has a current alignment 9. The current alignment 9 deviates from the reference direction 7 by a current yaw angle 10. In the present example, the current yaw angle 10 is greater than the initial yaw angle 8, but this is only to be understood as an example and does not necessarily have to be the same in general.

For the determination of the current position of the motor vehicle 3, the position determination system 4 processes data provided by respective sensor devices of the motor vehicle 3, not shown here, which indicate a respective wheel position in the circumferential direction for the four wheels.

By means of a calculation device of the position determination system 4, it is possible to determine from these sensor data concerning the respective wheel positions a respective wheel position change of the individual wheels during the motion of the motor vehicle from the initial position into the current position. For each wheel individually, the respective wheel position change, which is a measure for a distance traveled by the motor vehicle 3, is then converted into a motion of the reference point 5. A respective wheel steering angle and respective lever arms corresponding to an Ackermann geometry of the motor vehicle 3 or an Ackermann steering of the motor vehicle 3 are taken into account. The resulting motion of the reference point 5 may differ from each other, for example, due to measurement inaccuracies and/or relatively different positions of the respective sensor devices or similar. In order to achieve improved accuracy and resolution when determining the change in position of the motor vehicle 3, the calculated motions of the reference point 5—here for example four—are averaged. The averaging results in a single average motion or a single averaged motion vector, which can have an x and a y component.

The position determination system 4 or the motor vehicle 3 also comprises a yaw rate sensor whose measured values or sensor data are also processed by the calculation device. In addition, a time span $\Delta_t$ is also measured, which is required or has been required for the motion of the motor vehicle from the initial position to the current position. With the available data the current position $P_{k+1}=(x_{k+1}, y_{k+1})$ is calculated as $$P_{k+1}=P_k+s\cdot R(\text{yaw}_k+0.5\cdot\Delta_t\cdot\text{yawrate})$$

from the initial position $P_k$, the average motion vector s and the rotation matrix R, which rotates the average motion vector s by the angle ($\text{yaw}_k+0.5\cdot\Delta_t\cdot$yaw rate). In it, $\text{yaw}_k$ indicates the initial alignment 6, $\Delta_t$ the time elapsed during the motion from the initial position to the current position and yawrate the yaw rate. The yaw rate yawrate can be the last yaw rate measured in the current position. The current alignment 9 of the motor vehicle 3 can be calculated as $$\text{yaw}_{k+1}=\text{yaw}_k+\text{yawrate}\cdot\Delta_t.$$

In contrast to the FIG. 1, the current position and the initial position can also be much closer together. For example, it may be intended to determine the current position of the motor vehicle 3 during an operation of the motor vehicle 3 or at least during a certain mode of operation, such as during a parking maneuver, at regular intervals of, for example, 20 ms.

Altogether, the described exemplary embodiment shows how the invention can determine a current position of a motor vehicle relative to an initial position previously held by the motor vehicle.

The invention claimed is:

1. A method, comprising:
   measuring, at a sensor device, a change in a wheel position of a motor vehicle for at least two wheels of the motor vehicle from an initial position at coordinates $(x_k, y_k)$ to a current position $(x_{k+1}, y_{k+1})$;
   determining, at a calculation device, a motion vector corresponding to the change in the wheel position for each wheel of the at least two wheels of the motor vehicle;
   generating, at the calculation device, an averaged motion vector based on the motion vector corresponding to the change in the wheel position for the each wheel;
   determining a yaw angle of the motor vehicle in response to a yaw rate provided by a yaw rate sensor;
   in response to the determined yaw angle of the motor vehicle, rotating, at the calculation device, the averaged motion vector by the determined yaw angle from the initial position,
   thereby determining the current position of the motor vehicle.

2. The method of claim 1, further comprising determining an average yaw angle of the motor vehicle, wherein the averaged motion vector is rotated by the average yaw angle from the initial position.

3. The method of claim 1, further comprising calculating the current position $P_{k+1}$ of the motor vehicle at $(x_{k+1}, y_{k+1})$ coordinates as $P_{k+1}=P_k+s\cdot R(\delta)$,
   wherein $P_k$ is the initial position of the motor vehicle at coordinates $(x_k, y_k)$,
   wherein s is the averaged motion vector,
   wherein $R(\delta)$ is a rotation matrix which rotates the averaged motion vector by the yaw angle $\delta$ calculated as $(\text{yaw}_k+0.5\cdot\Delta_t\cdot\text{yawrate})$,
   wherein yawrate being the yaw rate provided by the yaw rate sensor, $\text{yaw}_k$ being an initial alignment at the initial position, and $\Delta_t$ being a time elapsed during the motor vehicle movement from the initial position to the current position.

4. The method of claim 1, further comprising determining the motion vector based on a wheel steering angle or an Ackermann geometry of the motor vehicle.

5. The method of claim 1, further comprising converting the change in the wheel position for each wheel into a corresponding motion vector of a vehicle-specific reference point, wherein the vehicle-specific reference point is used for calculating the change in the wheel position.

6. The method of claim 1, wherein the yaw rate is provided by the yaw rate sensor at every 10 milliseconds (ms) or 20 ms.

7. The method of claim 1, wherein the change in the wheel position is measured for the wheels spaced apart from one another along a longitudinal extension of the motor vehicle.

8. The method of claim 1, wherein the motion vector corresponding to the change in the wheel position of each wheel of the motor vehicle is determined in parallel.

9. The method of claim 1, wherein the calculation device is a control unit comprising a processor and a memory.

10. The method of claim 9, wherein the memory stores data specific to the motor vehicle, the data comprises at least one of a size of the motor vehicle, a size of the wheel of the motor vehicle, a size of a part of the motor vehicle, slip behavior of the wheel of the motor vehicle, a speed of the motor vehicle, and a radius of a curve.

11. A position determination system for determining a current position of a motor vehicle, comprising:
   at least two sensor devices configured to measure a change in a wheel position for at least two wheels of the motor vehicle;
   a yaw rate sensor; and
   a calculating device configured to:
      determine a motion vector corresponding to the change in the wheel position for each wheel of the at least two wheels;
      generate an averaged motion vector based on the motion vector corresponding to the change in the wheel position for the each wheel;
      determine a yaw angle of the motor vehicle in response to a yaw rate provided by the yaw rate sensor;
      in response to the determined yaw angle of the motor vehicle, rotate the averaged motion vector by the determined yaw angle from the initial position.

12. The position determination system of claim 11, wherein the change in the wheel position for the at least two wheels is measured in a circumferential direction.

13. The position determination system of claim 11, wherein the calculation device is a control unit comprising a processor and a memory.

14. The position determination system of claim 13, wherein the memory stores data specific to the motor vehicle, the data comprises at least one of a size of the motor vehicle, a size of the wheel of the motor vehicle, a size of a part of the motor vehicle, slip behavior of the wheel of the motor vehicle, a speed of the motor vehicle, and a radius of a curve.

15. The position determination system of claim 11, wherein the calculating device is further configured to determine the motion vector based on a wheel steering angle or an Ackermann geometry of the motor vehicle.

16. A motor vehicle, comprising:
- at least two sensor devices configured to measure a change in a wheel position for at least two wheels of the motor vehicle;
- a yaw rate sensor; and
- a calculating device for determining a current position of the motor vehicle, the calculating device configured to:
    - determine a motion vector corresponding to the change in the wheel position for each wheel of the at least two wheels;
    - generate an averaged motion vector based on the motion vector corresponding to the change in the wheel position for the each wheel;
    - determine a yaw angle of the motor vehicle in response to a yaw rate provided by the yaw rate sensor;
    - in response to the determined yaw angle of the motor vehicle, rotate the averaged motion vector by the determined yaw angle from the initial position.

17. The motor vehicle of claim 16, wherein the change in the wheel position for the at least two wheels is measured in a circumferential direction.

18. The motor vehicle of claim 16, wherein the calculation device is a control unit comprising a processor and a memory.

19. The motor vehicle of claim 18, wherein the memory stores data specific to the motor vehicle, the data comprises at least one of a size of the motor vehicle, a size of the wheel of the motor vehicle, a size of a part of the motor vehicle, slip behavior of the wheel of the motor vehicle, a speed of the motor vehicle, and a radius of a curve.

20. The motor vehicle of claim 16, wherein the calculating device is further configured to determine the motion vector based on a wheel steering angle or an Ackermann geometry of the motor vehicle.

* * * * *